United States Patent [19]
Pigozzi

[11] Patent Number: 5,161,174
[45] Date of Patent: Nov. 3, 1992

[54] AUTOMATED POWER UNIT ASSEMBLY FOR A COMMERCIAL VEHICLE

[75] Inventor: Gian M. Pigozzi, Brescia, Italy

[73] Assignee: Iveco Fiat S.p.A., Turin, Italy

[21] Appl. No.: 727,651

[22] Filed: Jul. 9, 1991

[30] Foreign Application Priority Data

Jul. 10, 1990 [IT] Italy .............................. 67519 A/90

[51] Int. Cl.$^5$ .............................................. G06G 7/66
[52] U.S. Cl. ................................... 377/28; 364/424.1; 364/431.03; 340/456
[58] Field of Search ................ 377/28, 2; 364/424.1, 364/431.03; 340/450

[56] References Cited

U.S. PATENT DOCUMENTS

| 4,507,736 | 3/1985 | Klatt ................................. 364/424.1 |
| 4,732,055 | 3/1988 | Tateno et al. ........................ 74/866 |
| 4,763,264 | 8/1988 | Okuno et al. .................. 364/431.03 |
| 5,081,583 | 1/1992 | Kono et al. ...................... 364/424.1 |

FOREIGN PATENT DOCUMENTS

| 60-81546 | 9/1985 | Japan . |
| 61-171625 | 8/1986 | Japan . |
| 1596358 | 3/1978 | United Kingdom . |
| 0170465 | 7/1985 | United Kingdom . |
| 2042105 | 2/1990 | United Kingdom . |

Primary Examiner—Janice A. Howell
Assistant Examiner—Scott A. Ouellette
Attorney, Agent, or Firm—Kane, Dalsimer, Sullivan, Kurucz, Levy, Eisele and Richard

[57] ABSTRACT

A power unit assembly comprising an internal-combustion engine, a mechanical, unsynchronized gearbox, a clutch interposed between the engine and the gearbox, an inertia brake in which the gearbox, the relevant synchronization by means of the engine or the inertia brake and the control of the injection pump for the engine are controlled by an electronic processor adapted to inhibit the engagement of gear ratios to which an engine speed corresponds which does not fall within a programmed range of normal values; the processor is adapted to detect emergency operating conditions and, in such a case, to allow the engagement of a gear ratio which results in an engine speed value above said programmed range of values; to ensure synchronization even under such conditions the injection pump is provided with adjustment means adapted to allow speeds to be attained which are close to the upper limit of mechanical integrity of the engine.

11 Claims, 2 Drawing Sheets

AUTOMATED POWER UNIT ASSEMBLY FOR A COMMERCIAL VEHICLE

BACKGROUND OF THE INVENTION

The present invention relates to a power unit assembly for a commercial vehicle.

Power unit assemblies of the type comprising an internal-combuston engine, a mechanical gearbox, a clutch interposed between the engine and the gear change are known, in which the gearbox, the relevant synchronisation and the control of the injection pump for the engine are controlled by an electronic processor.

In power unit assemblies of the type briefly described above, the injection pump is usually provided with mechanical control means or it is controlled electronically so that the engine speed is maintained within a range of values between a lower or "minimum" limit, for example 600 rpm (below which the engine would stall), and an upper limit coinciding with the speed at maximum power of the engine itself.

Moreover, before effecting the engagement of the gear ratio required by the driver, said electronic processor normally carries out checks to verify whether said gear ratio is consistent with a speed range in which it is desirable for the engine itself to operate.

In particular, the control logic programmed into the processor usually prevents engine speeds from being attained, at the end of the gear-change operation, which are below the maximum torque speed (for example, equal to 1200 rpm) for the operations of changing to a higher gear ratio, or speeds above the maximum speed of rotation allowed by the injection pump (for "climbing" gear-change operations).

This logic fulfills the two aims of maintaining the engine within the predetermined speed range and of ensuring synchronisation of the gear change. In fact, if the management logic of the processor does not prevent the engagement of a gear ratio corresponding to an engine speed which is higher than the above-defined maximum speed, as a result of the maximum control exerted on the injection pump the engine would not be able to accelerate the gear masses to the synchronisation speed required by the gear ratio selected, thereby rendering impossible or even dangerous the engagement of the gear ratio itself.

To sum up, known power unit assemblies of the type briefly described above do not enable gear changes to be effected if, after this operation, the engine speed is above or below the normal operating range.

This is certainly an advantage under normal driving conditions; however, in certain driving conditions it may represent a dangerous drawback because it is not possible to carry out emergency gear changes which, on the other hand, are possible with conventional power unit assemblies having a gearbox with mechanical synchronisation. For example, one such case is the engagement of a very low gear ratio to utilise the braking action of the engine when descending a steep slope or in the event of failure of the braking system.

SUMMARY OF THE INVENTION

It is the object of the present invention to devise an automated power unit assembly which makes it possible to obviate the disadvantages associated with the above-mentioned known assemblies.

This object is achieved by the present invention in that it relates to an automated power unit assembly for a vehicle, of the type comprising:
— an internal-combustion engine;
— an injection pump for supplying fuel to said engine, said pump being provided with actuating control means, which can be controlled electrically from the outside, and with adjustment means defining a lower set value corresponding to a minimum speed value for running said engine and an upper set value corresponding to a maximum speed value, above which the fuel supply to said engine is decreased;
— a mechanical, unsynchronised gearbox;
— a clutch interposed between said engine and said gearbox;
— actuating means which can effect the engagement and disengagement of the gear ratios of said gearbox;
— first valve means for operating said actuating means of said gearbox;
— actuating means which can effect the engagement and disengagement of said clutch;
— second valve means for operating said actuating means of said clutch;
— a synchronising brake acting on a member of said gearbox;
— actuating means and associated valve means for operating said synchronising brake;
— manual gear selection means;
— sensor means which can detect operating parameters of said power unit assembly;
— transducer means associated with said manual gear selection means, and
— an electronic processor receiving input signals from said sensor means and said transducer means and adapted to generate control signals for said valve means, said processor comprising first processing means for calculating the engine speed following the engagement of a gear ratio selected by means of said manual selection means, and to prevent said engagement if said speed does not come within a programmed range of values, characterised in that said upper set value of said adjustment means of said pump corresponds to a speed value of said engine which is above an upper limit of said programmed range of values; said processor also comprising second processing means for detecting an emergency operating condition of said vehicle and for enabling a gear change corresponding to an engine speed above said programmed range of values when said emergency operating condition prevails.

BRIEF DESCRIPTION OF THE DRAWINGS

With a view to a better understanding of the present invention, a preferred form of embodiment will be described below non-restrictively by way of example, with reference to the accompanying drawings, wherein.

DETAILED DESCRIPTION OF THE INVENTION

Figure 1:
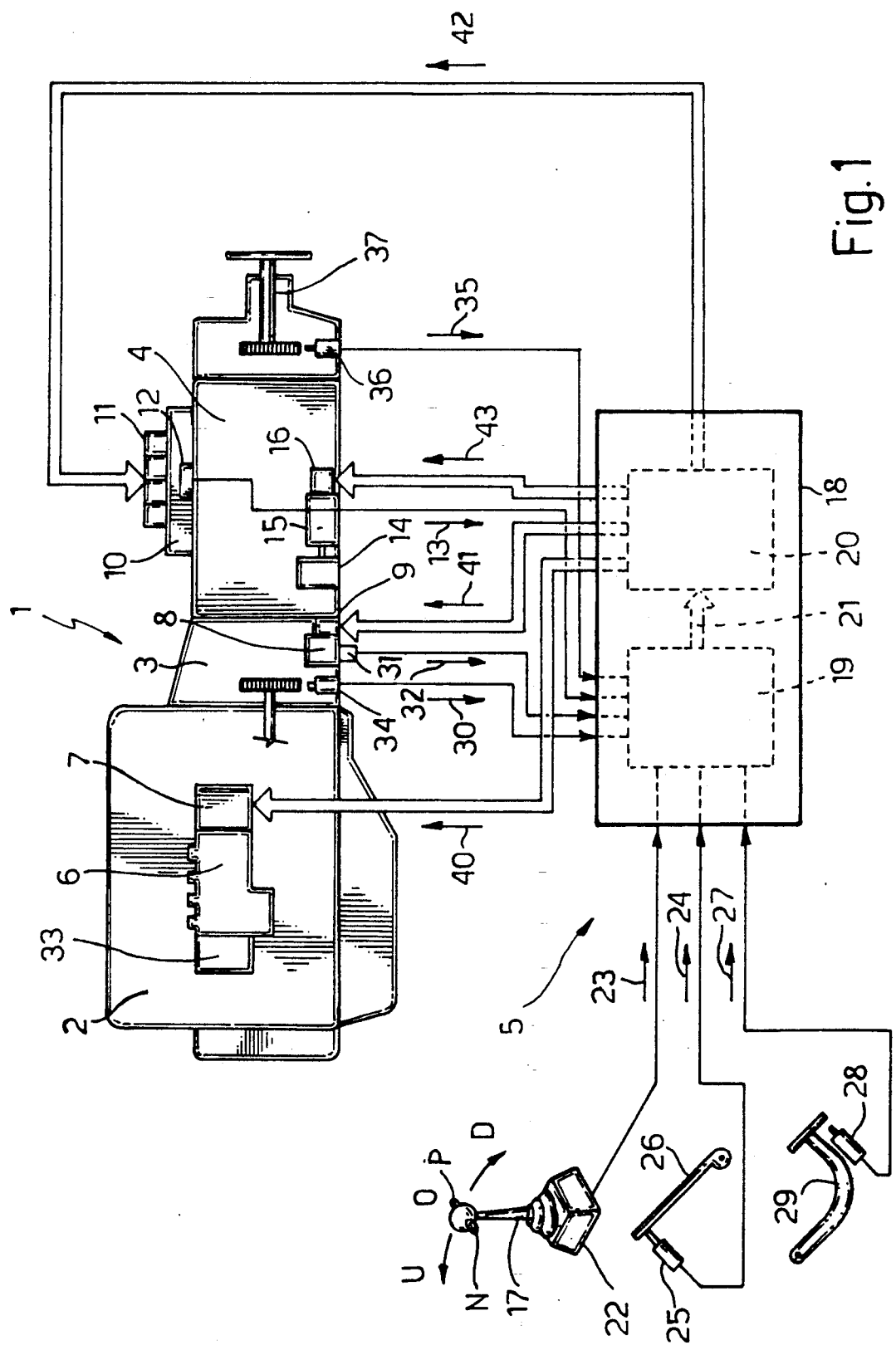
FIG. 1 illustrates illustrates a functional diagram of a power unit assembly developed in accordance with the present invention.

Referring now to FIG. 1, the reference numeral 1 generally denotes an automated power unit assembly for a commercial vehicle.

The assembly 1 comprises an internal-combustion engine 2, a clutch 3 and a gearbox 4 arranged one after the other, and a control device generally designated 5.

The fuel supply to the engine 2 is controlled by an injection pump 6 which is provided with a servomotor 7 enabling said pump to be controlled electrically from the outside. The pump 6 is also provided with a centrifugal governor 33 of known type, which is adapted to maintain a minimum supply level at the minimum running speed of the engine, for example 600 rpm, and to define an upper intervention threshold in accordance with which the supply is reduced so as to prevent the engine from exceeding a predetermined maximum speed.

According to the present invention, the maximum speed to which this intervention threshold corresponds is close to the maximum speed compatible with the mechanical integrity of the engine and, for example, is equal to 2600 rpm. The power unit assembly 1 is also provided with a hydraulic actuator 8 to actuate the clutch 3 and controlled by a solenoid valve 9, as well as hydraulic actuating means 10 for engaging and disengaging the gear ratios in the gearbox 4, said means being controlled by a plurality of solenoid valves 11. The actuator 8 and the actuating means 10 are of conventional type and, therefore, will not be described in detail.

The gearbox 4 is provided with an inertia brake 14 operated by a hydraulic actuator 15 controlled by a solenoid valve 16.

The control device 5 essentially comprises a gear selection lever 17 and an electronic processor 18.

The lever 17 is preferably of a type pivotable in a single plane between two opposite selection positions U and D, relative to a central neutral position O, to which there respectively corresponds the selection of a higher gear ratio or a lower gear ratio with respect to the gear ratio engaged. The lever 17 is preferably provided with a button N for selecting the neutral position in the gearbox 4 and with a button P which can be actuated in combination with the lever 17 to select multiple gear changes, in accordance with any recorded operational logic which does not form part of the present invention and which, therefore, will not be described. The lever 17 is associated with transducer means 22 which are adapted to detect the operation of the lever itself and of the buttons N, P, and to generate corresponding electrical signals.

The processor 18 comprises microprocessor-type processing means 19, which are adapted to receive a plurality of input signals indicating the operating conditions of the power unit assembly, and control means 20 adapted to generate a plurality of enabling signals for the various operations of the power unit assembly, in response to consent signals 21 generated by the processing means 19.

In particular, the processor receives the following input signals:
—gear selection signals 23 from the transducer means 22 associated with the lever 17;
—a signal 24 from a position sensor 25 for an accelerator pedal 26 of the vehicle;
—a signal 27 from a position sensor 28 for a brake pedal 29 of the vehicle;
—a signal 30 from a sensor 34 of the angular velocity of the drive shaft;
—a signal 35 from a speed sensor 36 for an output shaft 37 of the gearbox 4;
—signals 13 from means 12 detecting the gear engaged, which means are associated with the actuating means 10;
—a signal 32 from a position sensor 31 associated with the clutch actuator 8, indicating the position of the clutch.

In response to said input signals the processor 18 is able to generate the following output signals:
a control signal 40 for the servomotor 7 of the injection pump 6;
signal 41 for the solenoid valve 9 of the actuator 8 for the clutch 3;
control signals 42 for the solenoid valves 11 of the actuating means 10 for the gearbox 4;
a control signal 43 for the solenoid valve 16 of the cylinder 15 of the inertia brake 14.

Figure 2:
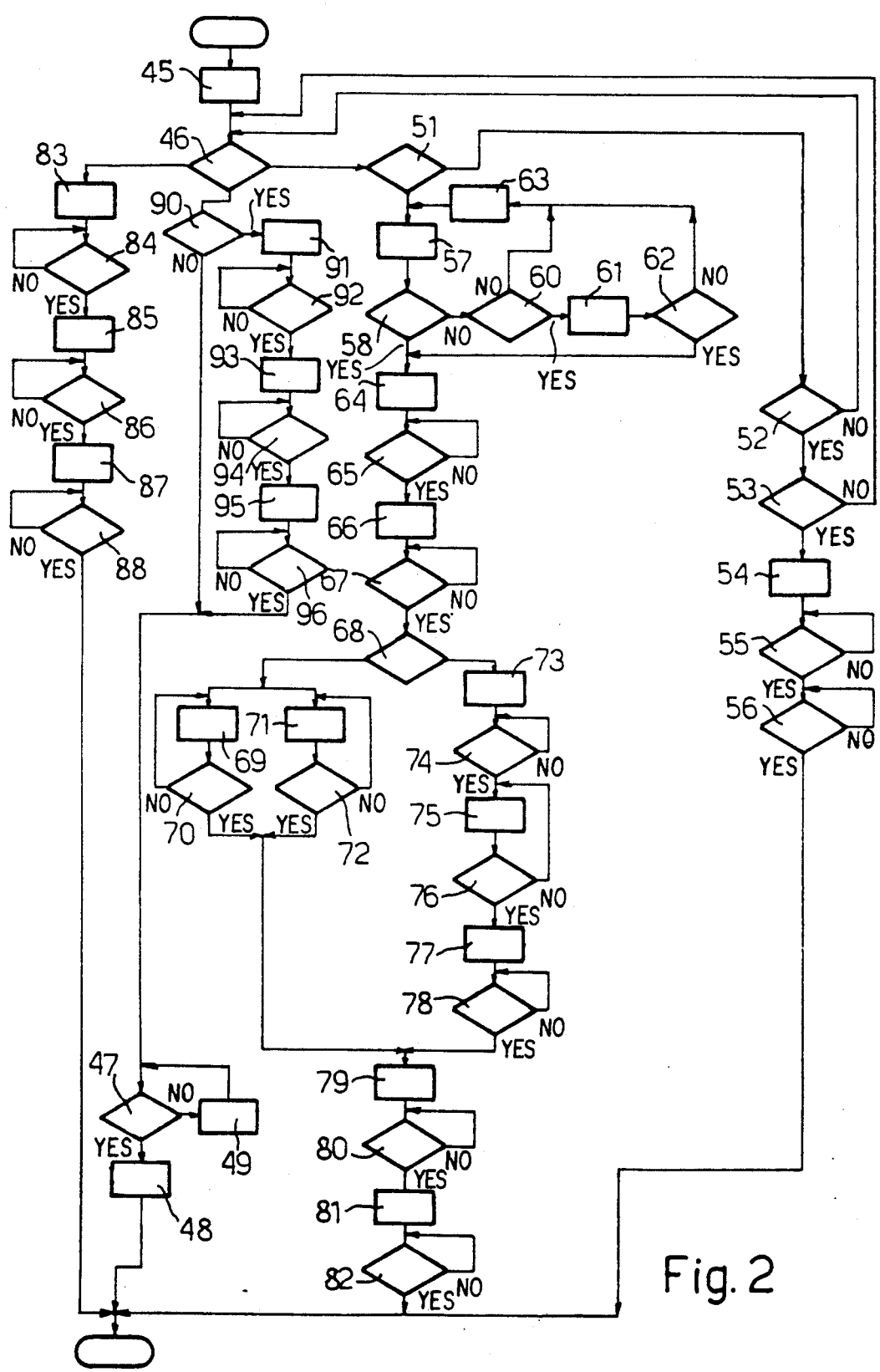
FIG. 2 illustrates a block diagram of the operating logic of an electronic control processor of the power unit assembly in FIG. 1.

FIG. 2 illustrates a block diagram of the operating logic of the processor 18 relating, in particular, to the processing carried out cyclically by the processing means 19.

An input block 45 receives the signals relating to the operating conditions of the power unit assembly and, in particular, the signals relating to engine speed (signal 30 from sensor 34), to the speed of the output shaft 37 of the gearbox (signal 35 from sensor 36), to the position of the accelerator pedal 26 (signal 24 from sensor 25), to the position of the brake pedal 29 (signal 27 from sensor 28), to the possible operation of the lever 17 and/or of the buttons N, P (signals 23 from transducer means 22), to the position of the clutch (3 (signal 32 from sensor 31) and to the gear engaged (signal 13 from detecting means 12).

This is followed by a comparator block 46 which verifies whether and which gear ratio has been selected with the lever 17, or if the neutral position has been selected by means of the button N.

If the lever 17 and the button N have not been actuated, a subsequent comparator block 90 verifies whether the output speed of the gearbox is lower than a threshold value $V_0$ corresponding to an extremely low vehicle speed, for example 0.5 km/h. If the result is negative, or on the other hand the vehicle is moving, a subsequent comparator block 47 verifies whether the engine speed is lower than a threshold value equal to the speed at maximum power $V_{Pmax}$, for example equal to 2000 rpm. If the result is positive, the next block 48 enables control of the injection pump 6 as a function of the position of the accelerator pedal, in accordance with a predetermined recorded instruction which, for example, associates a corresponding effective mean pressure or speed value of the engine with each value in respect of the accelerator pedal position.

Therefore, passing from the block 48 the end of the cycle is reached.

However, if the engine speed is higher than or equal to the aforesaid threshold value a block 49 then follows for inhibiting the manual control of the fuel supply, which is adapted to enable a decrease in the supply to the engine; the output of the block 49 is fedback to the input of the block 47.

If the block 90 detects an output speed of the gearbox lower than $V_0$, a block 91 is reached for enabling the disengagement of the clutch itself. The next block 92 verifies, from the condition of the signal 32, whether the clutch is disengaged. If so, the next block 93 then serves to enable the disengagement of the gear ratio already engaged; in the contrary case, the processing unit returns upstream of the block 93, thereby defining a waiting procedure in respect of the mechanical execution of the operation of disengaging the clutch.

Downstream of the block 93 there is disposed a subsequent verifying block 94 which verifies the execution of the operation, on the basis of the condition of the signals 13, and thus passes to the next block 95 only in response to the gearbox having already been prearranged in neutral.

The block 95 enables the execution of the engagement operation of the clutch. At the output from the block 68 there is disposed a subsequent block 96 for verifying the execution of the operation, on the basis of the condition of the signal 32. If this corresponds to the engaged condition of the clutch, the input to the block 47 is then reached; in the contary case, the processing unit returns upstream of the block 96, thereby defining a waiting procedure in respect of the execution of re-engagement of the clutch.

However, in the event of the block 46 detecting the selection of a gear ratio, a comparator block 51 is then reached which is entirely analogous to the aforementioned block 90; if the speed of the output shaft of the gearbox is lower than said threshold value $V_0$, or on the other hand if the vehicle is substantially stationary, a block 52 is reached which verifies the disengaged condition of the clutch, on the basis of the condition of the signal 32. If the result is positive, it passes to the next block 53; in the contrary case, the processing unit returns upstream of the block 46, whereupon the engagement instruction is ignored in the absence of any preceding manual operation to disengage the clutch.

Said block 53 verifies whether the gear ratio selected is one of those admissible for a sudden manoeuvre of the vehicle, for example the first or second forward gears or a reverse gear. If this condition is not verified, a return to the block 46 takes place. However, if the aforesaid condition is verified, a block 54 is reached for actuating the engagement of the preselected gear ratio.

A comparator block 55 is disposed at the output of the block 54 and is adapted to verify the condition of the signals 13, thereby detecting the engagement of the gear ratio selected. If the result is negative, a return to upstream of the block 54 takes place but, if the result is positive, a subsequent block 56 is reached for verifying the condition of the signal 32. If this corresponds to the engaged condition of the clutch, the end of the cycle is reached; in the contrary case, the processing unit returns upstream of the block 53, thereby defining a waiting procedure in respect of the manual operation of re-engagement of the clutch.

In the case in which, in the block 51, the speed of the output shaft of the gearbox is found to be higher than the aforesaid threshold value, i.e. when the vehicle is moving, a block 56 is reached which is adapted to calculate, on the basis of the transmission ratio of the gear selected (defined by the block 46) and on the speed of the speed of the output shaft of the gearbox (detected by the sensor 36), the speed of rotation of the drive shaft as a result of the engagement of the gear itself.

In the next block 58 this speed is compared with a lower limit value, preferably equal to the speed at maximum engine torque ($V_{Cmax}$), for example equal to 1000 rpm, and with an upper limit value, preferably equal to the speed at maximum engine power ($V_{Cmax}$), for example equal to 2000 rpm. If this speed comes within the nominal operating range of the engine defined by the aforementioned limit values, a series of blocks (59 et seq.) are reached, which will be described in detail below and which are adapted to enable the disengagement of the gear ratio already engaged and the engagement of the gear ratio selected.

If this speed does not come within said operating range, passing from the block 58 a block 60 is reached which is adapted to verify the existence of the following operating conditions, corresponding at least potentially to an emergency situation:
—brake pedal 29 fully depressed (condition detected by the sensor 28);
—accelerator pedal 26 released (condition detected by the sensor 25).

If these conditions are simultaneously verified, the next block 61 is then reached which periodically detects the signal 30 indicating the speed of the drive shaft and compares each value detected with the preceding value, thereby providing an indication of engine deceleration.

A comparator block 62 is then reached which verifies whether the engine speed is higher than a predetermined threshold value close to ($V_{Pmax}$) and whether the engine deceleration is lower than predetermined stored values.

If both of said conditions are verified, said block 64 is reached, in the contrary case a block 63 is reached adapted to select a gear ratio adjacent to that initially selected and closer to that engaged at that time; at the output from the block 63 a return is made, in a closed loop, to the input of the block 57. The blocks 64, 65, 66 and 67, arranged mutually in sequence, are entirely analogous to the blocks 91 to 94 described above and, therefore, are able to enable and verify the disengagement of the clutch and the disengagement of the gear ratio already engaged.

A comparator block 68 is then reached which is adapted to verify whether a higher or lower gear ratio to that already engaged is required.

In the first case, the next block 69 enables the operation of the inertia brake so as to retard the rotating input members of the gearbox. Downstream of the block 69 a block 70 verifies whether synchronisation has taken place by comparing the speed of the input shaft of the gearbox with the theoretical speed calculated in the block 57, which represents the synchronisation speed at which the input shaft of the gearbox should rotate at the instant at which the new gear ratio is engaged. Preferably, the verification is effected with reference to a synchronisation interval, which is defined by a predetermined approximate amplitude of the above-defined synchronising speed, in which the synchronism condition is verified in an approximate but acceptable manner. If the synchronism condition is not verified, a return to upstream of the block 69 takes place; in the contrary case, a block 79 is reached for enabling the engagement of the gear ratio. "Simultaneously" with the speed control of the input shaft of the gearbox there is provided an automatic control of the engine speed. In particular, a block 71 is adapted to reduce the fuel supply to the engine in accordance with a predetermined instruction and the next block 72 is adapted to verify the attainment of said synchronisation speed. It is pointed out that the term "simultaneously" is to be understood to relate to the accomplishment of the complete control operation, it being evident to the person skilled in the art that the processing is dedicated cyclically to one or other control operation effected by the blocks 69, 70 and 71, 72 by means of suitable division of the processing times.

From the output of blocks 70, 72, namely when the synchronism condition is attained, a block 79 is then reached for enabling the engagement of the preselected gear ratio.

However, in the case in which the block 68 detects the selection of a lower gear ratio, i.e. for "climbing", a block 73 is reached which enables the execution of the clutch engagement operation for the purpose of connecting the input members of the clutch to the drive shaft. A block 74 is disposed at the output of the block 73 for verifying the execution of operation and it is completely identical to the block 56 described above.

A block 75 is then reached which is adapted to prevent manual control of the injection pump 6 and to enable an increase in the amount of fuel delivered by the pump so as to bring the engine, and therefore the input members of the gearbox connected therewith, towards the aforementioned synchronisation interval.

A subsequent comparator block 76 verifies the attainment of the synchronism condition; if the result is negative a return to the preceding block takes place, whereas if the result is positive the next block 77 is reached, which enables disengagement of the clutch, and then next verifying block 78 is reached which is entirely analogous to the block 65 described above. Therefore, said block 79 is reached which enables the engagement of the preselected gear ratio and then a verifying block 80 is reached which is identical to the block 55 described above.

Finally, two subsequent blocks 80, 81 are reached which are wholly identical to the aforesaid blocks 73, 74 respectively, which are adapted respectively to enable the clutch to be engaged once more and to effect verification of the execution of these operations, whereupon the end of the cycle is reached.

Returning now to the block 46, if this latter detects the selection of neutral, a series of blocks numbered 83 to 88 is reached, which are entirely identical to the aforementioned blocks 91 to 96 respectively, and have the purpose respectively of enabling the disengagement of the clutch, of verifying the execution of the operation, of enabling the disengagement of the gear ratio already engaged, of verifying the execution of this latter operation, of enabling the re-engagement of the clutch and of effecting the subsequent verification thereof; the end of the cycle is reached at the output from the block 88.

The mode of operation of the power unit assembly 1, which is already partly evident from the foregoing description, is as follows.

As a result of the adjustment of the centrifugal governor 33 of the pump 6 and without the intervention of a corrective control of the speed range, the engine would operate between the minimum running speed, for example 600 rpm, and the maximum speed defined by the limits of mechanical integrity, for example 2600 rpm.

During the normal operation of the power unit assembly 1, the processor 18 (blocks 47, 49) controls the supply pump 6 as a function of the position of the accelerator (block 48) but it intervenes to reduce the supply (blocks 47, 49) when the speed reaches $V_{Pmax}$, in this particular case equal to 2000 rpm, which therefore becomes the upper engine speed limit, replacing the upper limit conventionally defined by the intervention of the centrifugal governor in known power unit assemblies.

When the vehicle is moving and normal operating conditions prevail, following a request for a change of gear ratio the processor locates the preselected gear ratio and verifies whether the resultant engine speed, calculated on the basis of the transmission ratio corresponding to this gear ratio (block 57), comes within the range of values included between the speed at maximum torque and the speed at maximum power, i.e. in this particular case between 1200 and 2000 rpm. In the result of this verification (block 58) is positive, the engagement of the new gear ratio is enabled, subject to synchronisation by acceleration of the engine or intervention of the inertia brake.

However, if the result of the aforesaid verification is negative, the processor, before inhibiting the engagement of the gear ratio, carries out a subsequent verification for the purpose of detecting a possible emergency situation.

In particular, if the brake pedal is pressed and the accelerator pedal fully released, the processor (block 61) detects the corresponding deceleration of the vehicle and compares it (block 62) with stored programmed values; if this deceleration is lower than the anticipated values, i.e. in the event of a malfunction of the braking system, the processor enables the engagement of the new gear ratio, even if this entails over-revving the engine. In this particular case, under conditions in which there is a malfunction of the braking system, gear changes into "climbing" ratios are even permitted which result in an engine speed of up to 2600 rpm, in excess of which synchronisation is no longer possible and the engine would be damaged.

If the aforesaid emergency condition is not detected, gear changes at speeds above $V_{Pmax}$ are prevented; the processor 18 automatically (block 63) substitutes the preselected gear ratio with that immediately adjacent thereto and which is closer to the gear ratio already engaged, whereupon verification is repeated, enabling engagement to occur only when the gear ratio meets the speed conditions corresponding to the normal operation of the engine.

It is readily apparent from the diagram of FIG. 2 that the processor automatically controls the clutch in any operating condition, with the exception of sudden maneuvers (blocks 52-56), in which control of the clutch actuator is effected by means of the pedal.

During a gear change the processor 18 brings about the disengagement of the clutch so as to allow the disengagement of the gear already engaged.

In the event of a change from a lower gear ratio to a higher gear ratio, the clutch is left disengaged so as to uncouple the input members of the gearbox, which are retarded by the inertia brake, from the engine which is itself decelerated by a decrease in fuel supply. When synchronism is achieved, the gear ratio is engaged and the clutch is then re-engaged.

With a view to the synchronisation of gear changes for "climbing" ratios, however, the clutch is re-engaged so as to reconnect the input members of the gearbox to the engine. Therefore, when synchronisation has been effected in known manner, the processor disengages the clutch again so as to allow the engagement of the new gear ratio and re-engages it when this engagement has been effected. When the vehicle is stationary, the processor automatically puts the gearbox into the neutral condition, having previously controlled the disengagement of the clutch and subsequently its re-engagement (blocks 91-96).

An analogous operation is carried out (blocks 83-88) following a manual operation to select neutral by means of the button N.

A study of the features of the power unit assembly 1 developed in accordance with the present invention reveals the advantages which can be achieved thereby.

Above all, in certain emergency operating conditions recognised by the power unit assembly, it enables gear changes for "climbing" ratios and the corresponding synchronisation to be effected, which result in an engine speed above the nominal range of operating values up to the maximum engine speed compatible with the mechanical integrity of the engine itself. In this way it is possible to bring the vehicle to a halt or at least to effect a substantial retardation of the vehicle in the event of malfunction of the braking system, which is not normally possible with the known electronic control logics of automated power unit assemblies.

However, under normal operating conditions, the processor prevents the engagement of gear ratios which could take the engine outside the said nominal operating range.

Finally, it is evident that the assembly 1 described above could undergo various modifications, without departing from the scope of the present invention. In particular, the gearbox 4 may be of any type of construction, provided that it is unsynchronised. The gear selection lever and the coded logic for the gear ratios, as function of the positions of the lever itself and of the operation of the buttons associated therewith, may be of any type desired; the processor may be adapted to detect emergency operating conditions and, in particular, malfunction of the braking system on the basis of different criteria, for example by determining the speed of the drive shaft instead of the gearbox output shaft, or the pressure of the operating fluid for the braking system.

I claim:

1. An automated power unit assembly for a vehicle, of the type comprising:
—an internal-combustion engine;
—an injection pump for supplying fuel to said engine, said pump being provided with actuating control means, which can be controlled electrically from outside the assembly, and with adjustment means defining a lower set value corresponding to a minimum speed value for running said engine and an upper set value corresponding to a maximum speed value, above which the fuel supply to said engine is decreased;
—a mechanical, unsynchronised gearbox;
—a clutch interposed between said engine and said gearbox;
—actuating means which can effect engagement and disengagement of gear ratios of said gearbox;
—first valve means for operating said actuating means of said gearbox;
—actuating means which can effect engagement and disengagement of said clutch;
—second valve means for operating said actuating means of said clutch;
—a synchronising brake acting on a member of said gearbox;
—actuating means and associated valve means for operating said synchronising brake;
—manual gear selection means;
—sensor means which can detect operating parameters of said power unit assembly;
—transducer means associated with said manual gear selection means, and
—an electronic processor receiving input signals from said sensor means and said transducer means and adapted to generate control signals for said valve means, said processor comprising first processing means for calculating the engine speed following the engagement of a gear ratio selected by means of said manual gear selection means, and to prevent said engagement if said speed does not come within a programmed range of values, characterized in that said upper set value of said adjustment means (33) of said injection pump (6) corresponds to a speed value of said engine (2) which is above an upper limit of said programmed range of values; said processor (18) also comprising second processing means (60, 61, 62) for detecting an emergency operating condition of said vehicle and for enabling a gear change corresponding to an engine speed above said programmed range of values when said emergency operating condition prevails.

2. An assembly according to claim 1, characterized in that said second processing means comprise means (60, 61, 62) for verifying efficiency of a braking system of said vehicle.

3. An assembly according to claim 2, characterized in that said verifying means comprise means (61) for cyclic acquisition of a signal (35) indicating vehicle speed from said sensor means (36) and for calculating a deceleration of vehicle on the basis of said signal, and means (62) for comparing said deceleration with predetermined values.

4. An assembly according to claim 3, characterized in that said sensor means comprise a speed sensor (36) of an output shaft (37) of the gearbox (4) adapted to generate said signal (35) indicating the speed of the vehicle.

5. An assembly according to claim 1, characterized in that said sensor means comprise a position sensor (25) for an accelerator pedal (26) of said vehicle, a position sensor (28) for a brake pedal (29), a sensor (34) of angular velocity of a drive shaft and sensor of angular velocity of an output shaft of said gearbox.

6. An assembly according to claim 3, characterized in that said verifying means also comprise means (60, 62) for evaluating signals from a position sensor (25) of an accelerator pedal (26), from a position sensor (28) for a brake pedal (29) and from a sensor (34) of angular velocity of a drive shaft, said verifying means being adapted to detect an emergency situation in response to signals corresponding to the following combination of conditions:
—brake-pedal (29) depressed;
—accelerator pedal (26) released;
—engine speed at least close to an upper limit of said programmed range of values;
—deceleration of the vehicle below a predetermined value.

7. An assembly according to claim 1, characterized in that said adjustment means comprise a mechanical centrifugal governor (33).

8. An assembly according to claim 1, characterized in that said adjustment means comprise electronic control means.

9. An assembly according to claim 1, characterized in that said said upper set value of said adjustment means corresponds to a speed value of said engine (2) which is at least close to an upper limit of mechanical integrity of the motor itself.

10. An assembly according to claim 1, characterized in that said said programmed range of engine speed values falls at least approximately within a range of between 1200 and 2000 rpm; said upper set value of said adjustment means corresponding at least approximately to 2600 rpm.

11. An assembly according to claim 2, characterized in that said verifying means comprise means for sensing pressure of a braking installation of said vehicle.

* * * * *